United States Patent [19]

Rhee

[11] 3,740,470

[45] June 19, 1973

[54] NOISE SUPPRESSION CIRCUIT

[75] Inventor: Dong Woo Rhee, Williamsville, N.Y.

[73] Assignee: GTE Sylvania Incorporated, Seneca Falls, N.Y.

[22] Filed: Dec. 30, 1971

[21] Appl. No.: 214,265

[52] U.S. Cl. ........................ 178/7.3 S, 178/DIG. 12
[51] Int. Cl. ............................................ H04n 5/08
[58] Field of Search ................ 178/DIG. 12, 7.3 R, 178/7.3 S, 7.5 R, 7.5 S

[56] References Cited

UNITED STATES PATENTS 3,579,251 5/1971 Lovelace ........................ 178/7.3 R

*Primary Examiner*—Robert L. Griffin
*Assistant Examiner*—George G. Stellar
*Attorney*—Norman J. O'Malley and Robert E. Wabroth

[57] ABSTRACT

A noise suppression circuit for television receivers suitable for implementation in integrated circuit form on a monolithic semiconductor chip is shown. Noise pulses of an amplitude greater than the synchronizing pulse amplitude are detected and a signal indicative of the presence of the noize pulses is used to turn on a transistor connected between an amplifier and a source of reference potential to suppress the noise pulses. First and second current sources where the second current source provides a larger current than the first current source are connected in series with the transistor to prevent the transistor from remaining saturated and thereby improperly suppressing synchronizing pulses.

12 Claims, 2 Drawing Figures

NOISE SUPPRESSION CIRCUIT

CROSS-REFERENCE TO RELATED APPLICATIONS

Dong W. Rhee, "Self-Tracking Noise Suppressing Circuit," Ser. No. 124,341, filed Mar. 15, 1971, now U.S. Pat. No. 3,700,803 and assigned to the same assignee as this invention; and Dong W. Rhee, "Controlled Oscillator," Ser. No. 207,216 filed Dec. 13, 1971, and assigned to the same assignee as this invention.

BACKGROUND OF THE INVENTION

This invention relates to noise suppression circuitry for use in television receivers. In typical television receivers an RF modulated television signal is received and processed, i.e., amplified, filtered, and demodulated to provide a composite video signal. The composite video signal contains video information which is utilized to modulate an electron beam or beams in a cathode ray tube and synchronizing information to synchronize the scanning of the electron beams of the cathode ray tube with the video information to create a coherent display. The synchronizing information is in the form of synchronizing pulses which extend beyond the black level of the composite video signal and which occur during the vertical and horizontal retrace or blanking intervals.

The synchronizing pulses are separated from the composite video signal in an amplitude clipper known as a synchronizing pulse separator. High level noise pulses included in the composite video signal may also contain sufficient energy to cause the synchronizing pulse separator to operate thereby disturbing the scanning of the cathode ray tube.

Many circuits and schemes have been proposed in the prior art for cancelling or suppressing the effect of such high level noise pulses. Typical prior art techniques include noise gates which disable the synchronizing pulse separator in the presence of high level noise and noise cancellation circuits which clip and invert the noise pulse and add the inverted noise to the composite video signal to cancel the noise pulse therefrom. Other similar techniques are also known in the prior art.

While circuits using such prior art techniques have been developed and operate more or less satisfactorily, they suffer from one or more disadvantages. Some circuits operate unsatisfactorily and may deleteriously affect operation of the receiver. Other circuits are unduly complex requiring intricate adjustment, are unduly expensive, are unreliable, provide less than satisfactory performance, or suffer from other similar disadvantages. Furthermore, most prior art circuits are not susceptible to integration on a monolithic semiconductor chip. Known circuits which are susceptible to such integration, however, also suffer from many of the above-noted disadvantages.

OBJECTS AND SUMMARY OF THE INVENTION

It is a primary object of this invention to provide a noise suppression circuit that obviates the above-noted and other disadvantages of the prior art.

It is a further object of this invention to provide a noise suppression circuit that is susceptible of integration on a monolithic semiconductor chip.

It is a further object of this invention to provide a highly reliable, inexpensive noise suppression circuit with superior performance.

In one aspect of this invention the above and other objects and advantages are achieved in a noise suppression circuit for a television receiver that includes a signal processing channel for processing a received television signal to provide a composite video signal including video information and synchronizing information in the form of pulses. The noise suppression circuit includes an amplifying means for amplifying the composite video signal or a transistor means, a noise detecting means or a transistor means for providing a signal indicative of noise signals having amplitudes greater than the synchronizing pulses, a transistor, and first and second current sources wherein the second current source provides a larger current than the first current source. An input electrode of the transistor is connected to the noise detecting means, an output electrode is connected to the amplifying means or transistor means and to the second current source, and a reference electrode is connected to the first current source. The transistor suppresses noise signals in reponse to the detection of such noise signals by the noise detecting means.

DETAILED DESCRIPTION OF THE PREFERRED EMBODIMENT

For a better understanding of the present invention, together with other and further objects, advantages, and capabilities thereof, reference is made to the following disclosure and appended claims in connection with the above-described drawings.

Figure 1:
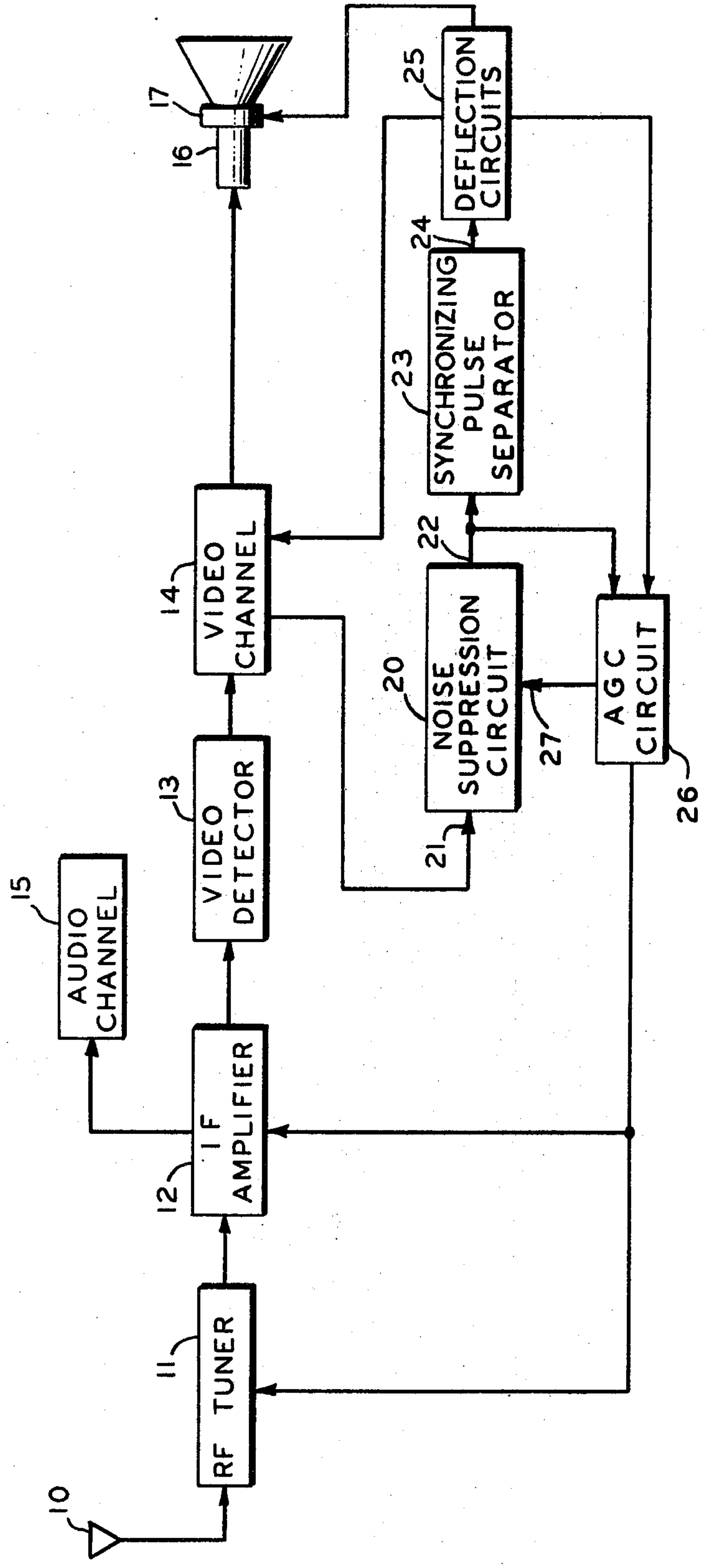
FIG. 1 is a block diagram of a television receiver in which the invention can be utilized.

In FIG. 1 an antenna 10 for intercepting transmitted RF modulated television signals is connected to a signal processing channel that processes the received television signal to provide a composite video signal including video and synchronizing information in the form of pulses. The signal processing channel includes an RF tuner 11 connected to antenna 10 that heterodynes the received RF modulated television signal to IF frequencies, an IF amplifier 12 connected to RF tuner 11, a video detector 13, and a video channel 14. An audio channel 15 is connected, for example, to a stage of IF amplifier 12 to receive and process the audio portion of the received signal. An output of video channel 14 is connected to a display device illustrated schematically as a cathode ray tube (CRT) 16 to couple luminance and/or chrominance information signals to CRT 16.

A synchronizing channel is connected to the signal processing channel for receiving at least the synchronizing pulses of the composite video signal and to a yoke 17 positioned about the neck of CRT 16 for synchronizing the operation of CRT 16 by synchronizing the deflection of one or more electron beams therein with the received signal. The synchronizing channel includes a noise suppression circuit 20 which has an input 21 connected to an output of video channel 14. An output 22 of circuit 20 is connected to an input of a synchronizing pulse separator 23 which separates the vertical and horizontal synchronizing pulses from the composite video signal. An output 24 of synchronizing pulse separator 23 is connected to deflection circuits 25 which provide horizontal and vertical deflection signals to yoke 17.

Output 22 of circuit 20 is further connected to an input of an AGC circuit 26 which has an output connected to inputs of RF tuner 11 and IF amplifier 12 for controlling the gains thereof. The AGC circuit 26 also receives an input from deflection circuits 25 which consists of flyback pulses in the case of keyed AGC. Blanking and gating pulses are also coupled from deflection circuits 25 to video channel 14. AGC circuit 26 has an output connected to an input 27 of noise suppression circuit 20.

In operation, at least the synchronizing pulses of the composite video signal are coupled from the signal processing channel to input 21 of circuit 20. In circuit 20 noise pulses having amplitudes greater than the synchronizing pulse amplitudes are suppressed before the signal is coupled to synchronizing pulse separator 23 and AGC circuit 26. Since AGC circuit 26 affects the amplitude of the synchronizing pulses, an output of AGC circuit 26 is coupled to input 27 of circuit 20 so that the noise detecting or clipping level in circuit 20 can track the AGC bias level. For example, typical AGC circuits include a bias adjustment potentiometer which is used to vary the amount of gain control and hence the amplitude of the composite video signal and synchronizing pulses. Input 27 is preferably coupled to the AGC bias potentiometer so that changes in AGC bias also adjust the noise clipping level in circuit 20.

Figure 2:
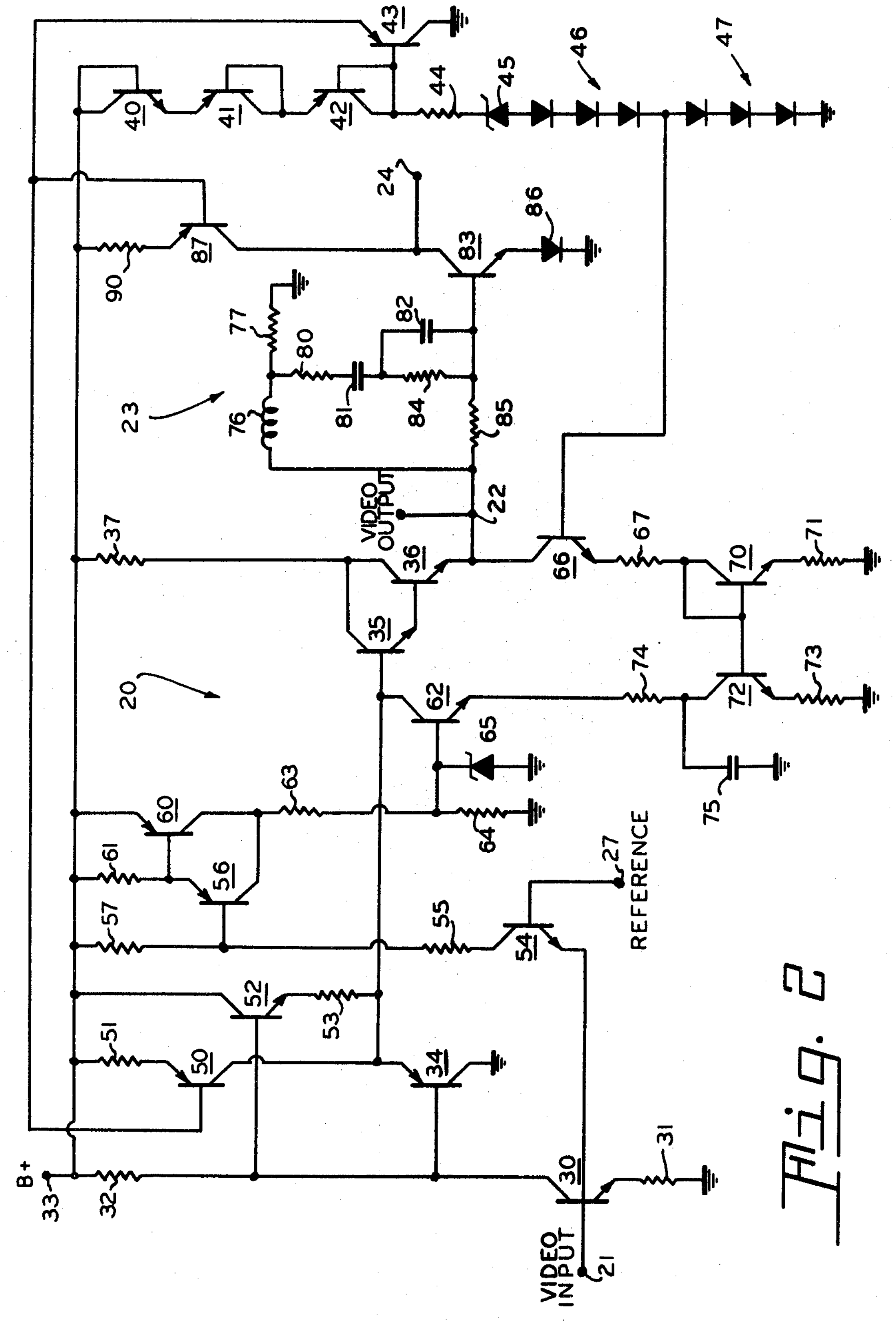
FIG. 2 is a schematic diagram of the preferred embodiment of the invention.

In FIG. 2 noise suppression circuit 20 and synchronizing pulse separator 23 are shown in greater detail. Input terminal 21 is connected via an amplifying means or transistor means to terminal 22. The amplifying means includes a transistor 30 which has a base connected to terminal 21, an emitter connected via a resistor 31 to a source of reference potential illustrated as a common conductor or circuit ground, and a collector connected via a resistor 32 to a source of positive potential illustrated as a 7 terminal 33. The collector of transistor 30 is further connected to a base of a transistor 34 which has a collector connected to ground. An emitter of transistor 34 is connected to a base of a transistor 35 which has a emitter connected to a base of a transistor 36. The collectors of transistors 35 and 36 are both connected via a resistor 37 to source 33 while an emitter of transistor 36 is connected to terminal 22.

Source 33 is connected to the base and collector of a transistor 40 which has an emitter connected to an emitter of a transistor 41. The base and collector of transistor 41 are both connected to an emitter of a transistor 42 which has a base and a collector both connected to a base of a transistor 43. A collector of transistor 43 is connected to ground. Transistors 40, 41, and 42 are essentially integrated circuit equivalents for diodes. The base of transistor 43 is connected via a resistor 44 to a cathode of a zener diode 45. An anode of zener diode 45 is connected by a set of three diodes 46 and a set of three diodes 47 to ground. Components 40–47 comprise a means for providing a set of reference or bias voltages. Transistors 40–42 provide a voltdrop substantially equivalent to that of three forward biased diodes between source 33 and the base of transistor 43. Power supply variations are compensated by voltage variations across resistor 44, while each of diodes 45–47 provides a voltage reference of a predetermined potential above ground.

An emitter of transistor 43 is connected to a base of a transistor 50 which has a collector connected to the emitter of transistor 34 and an emitter connected via a resistor 51 to source 33. Transistor 50 and its associated components and connections is a current source that acts as an active load for transistor 34. The collector of transistor 30 is further connected to a base of a transistor 52 which has a collector connected to source 33 and an emitter connected by a resistor 53 to the emitter of transistor 34. Transistor 52 is part of the current source including transistor 50. While transistor 50 supplies a substantially constant current of a magnitude determined by the biasing of transistor 50, transistor 52 is switched to provide a current in parallel with or in addition to the current through transistor 50.

Terminal 21 is further connected to a noise detecting means or transistor means which is also connected to terminal 27 for detecting noise signals in the composite video signal which have amplitudes greater than the synchronizing pulses and for providing a signal indicative thereof. The noise detecting means includes a transistor 54 which has an emitter connected to terminal 21 and a base connected to terminal 27. A collector of transistor 54 is connected by a resistor 55 to a base of a transistor 56. The base of transistor 56 is connected to source 33 by a resistor 57 while an emitter of transistor 56 is connected to a base of a transistor 60 and by a resistor 61 to source 33. An emitter of transistor 60 is connected to source 33.

A transistor 62 has an output electrode or collector connected to the emitter of transistor 34 and an input electrode or base connected by a current limiting resistor 63 to a collector of transistor 60. The base of transistor 62 is further connected to ground by a resistor 64 in parallel with a zener diode 65. Transistor 62 further has a reference electrode or emitter adapted to be connected to a source of reference potential.

The junction between diodes 46 and 47 is connected to a base of a transistor 66 which has a collector connected to the emitter of transistor 36. An emitter of transistor 66 is connected by a resistor 67 to a collector of a transistor 70 which has an emitter connected by a resistor 71 to ground. The collector of transistor 70 is connected to a base of transistor 70 and to a base of a transistor 72 which has an emitter connected to ground via a resistor 73. Transistor 72 is biased as a current source connected to the emitter of transistor 62 via a resistor 74 and to ground via a coupling capacitor 75.

Terminal 22 is connected to terminal 24 by synchronizing pulse separator 23. Terminal 22 is connected via a noise suppression inductor 76 in series with a resistor 77 to ground. The junction between inductor 76 and resistor 77 is connected by a resistor 80 in series with a capacitor 81 further in series with a capacitor 82 to a base of a transistor 83. A resistor 84 is connected in parallel with capacitor 82, while a resistor 85 is connected between terminal 22 and the base of transistor 83. An emitter of transistor 83 is connected by a diode 86 to ground. A collector of transistor 83 is connected to terminal 24 and to a collector of a transistor 87 which has a base connected to the emitter of transistor 43 and an emitter connected by a resistor 90 to source 33. Transistor 87 is a current source that acts as an active load for transistor 83.

In operation, a negative-going composite video signal is coupled via terminal 21 to the base of transistor 30. Transistor 30 amplifies and inverts the composite video signal. Transistor 34 is an emitter follower that couples the composite video signal to the base of transistor 35. Transistors 35 and 36 are also biased as an emitter follower amplifier and couple the composite video signal to terminal 22. Transistor 66 is biased as a current source which acts as an active load for transistors 35 and 36. Transistor 70 is biased to operate equivalent to a diode to maintain a suitable bias at the base of transistor 72.

During normal operation when there is no high amplitude noise in the composite video signal, transistors 54, 56, 60, and 62 are biased in a nonconducting condition or OFF. Transistor 72 carries no current except base current because transistor 62 is OFF. Thus, the composite video signal is coupled from terminal 21 to terminal 22 and hence to AGC circuit 26 and synchronizing pulse separator 23.

In synchronizing pulse separator 23, components 76, 77, 80, 81, 82, 84, and 85 comprise a bias circuit that tracks the synchronizing pulse amplitudes so that transistor 83 remains non-conductive except upon the occurrence of synchronizing pulses. Some or all of the components comprising the bias circuit may be external to the integrated circuit chip. When a synchronizing pulse occurs, it is coupled through inductor 76, resistor 80, and capacitors 81 and 82 to the base of transistor 83. Transistor 83 is switched ON by the synchronizing pulse whereby the potential of the collector of transistor 83 drops. Thus, a negative-going separated synchronizing pulse is coupled to terminal 24.

Noise pulses or signals present in the composite video signal will disturb the operation of synchronizing pulse separator 23 if the noise pulses are coupled thereto. Inductor 76 presents a high impedance to high frequency noise thereby tending to suppress such noise which typically is of a higher fequency than the synchronizing pulses. High level noise pulses, however, may have sufficient energy to switch transistor 83 thereby providing false synchronizing pulses to the deflection circuits. Such noise also affects the bias of capacitors 81 and 82 and may change the clipping level of synchronizing pulse separator 23. Such noise may also affect the AGC voltage developed by AGC circuit 26 thereby disturbing or changing the gain control signal and hence the gain of the RF and IF sections.

The negative-going composite video signal is also coupled from terminal 21 to the emitter of transistor 54. As long as the composite video signal is more positive than the reference voltage applied to terminal 27 and hence the base of transistor 54, transistor 54 will remain nonconducting. Accordingly, the reference level applied to terminal 27 is preferably of a sufficiently low magnitude that transistor 54 remains nonconducting when the synchronizing pulses occur.

If a high energy noise signal or pulse occurs that has a magnitude greater than the tip of the synchronizing pulse, transistor 54 switches to a conducting condition or ON. Since this noise pulse is a negative-going signal, current flows from source 33 through resistors 57 and 55 and transistor 54 to switch transistors 56 and 60 to conductive conditions or ON. Current flow from source 33 through transistor 60 and resistors 63 and 64 causes transistor 62 to switch from a nonconducting condition to a conducting condition or ON. Zener diode 65 limits the voltage at the base of transistor 62 to a safe level. The noise pulse at terminal 21 is also coupled through transistors 30 and 34 to the collector of transistor 62 at which a large positive-going noise pulse is presented.

When transistor 62 switches ON, current flows from source 33 through resistor 51, transistor 50, transistor 62, resistor 74, and capacitor 75 to ground. The current source including transistor 72 also conducts current. Assume, for example, that the current source including transistor 50 provides about one milliampere (ma) of current to the collector of transistor 62, that the current source including transistor 72 takes a maximum of one-half ma, and that capacitor 75 is uncharged when transistor 62 switches ON. The current through transistor 62 and flowing through capacitor 75 is greater than the current flowing through transistor 50 so that transistor 62 saturates to lower the collector voltage of transistor 62 thereby suppressing the noise pulse.

The voltage of the emitter of transistor 34 drops due to the conduction of transistor 62 thereby lowering the voltage of the emitter of transistor 52. When this voltage drops an amount sufficient to cause transistor 52 to become conductive, current flows from source 33 through transistor 52 and resistor 53 to the collector of transistor 62. Transistor 52 limits the voltage drop at the collector of transistor 62 to prevent transistor 62 from driving the composite video signal too low.

When the noise pulse ends, transistors 54, 56, and 60 switch OFF to remove the base drive from transistor 62. The current through transistor 52 aids in bringing transistor 62 out of saturation if transistor 62 was in saturation due to excessive high energy impulse noise signals. As the collector voltage of transistor 62 rises, transistor 52 turns OFF. The current source including transistor 72 discharges capacitor 75. This discharge, regardless of charged voltage level, is more rapid than would be obtained if a resistor were substituted for the current source. Thus, noise-free video or video in which the noise is suppressed is coupled through transistors 35 and 36 to terminal 22. The noise is ac coupled by capacitor 75 which ac couples the reference electrode of transistor 62 to a source of reference potential. This feature is particularly significant because only one external connecting pin is needed on an integrated circuit package for the capacitor rather than the two pins normally required for an ac coupling capacitor.

Next assume that the television receiver is receiving a relatively weak signal and is then switched to a channel that provides a stronger signal. AGC circuit 26 increases the gain of the RF and IF amplifiers in response to the weak signal. When the channels are switched to a stronger received signal, the amplitudes of the synchronizing pulses may be sufficient to cause transistor 54 to switch ON thereby causing the circuit to suppress the synchronizing pulses. Since AGC circuit 26 is preferably of the type that maintains the synchronizing pulses at a relatively constant amplitude, suppression of the synchronizing pulses will cause AGC circuit 26 to further increase the gain of the RF and IF amplifiers. Thus, the receiver would "lock-up" and operate improperly. Under these circumstances, however, capacitor 75 charges so that the current through transistor 62 is limited to the current flow through transistor 72. Since the current flow through transistor 72 is less than the current provided by transistor 50, transistor 62 is brought out of saturation so that the video signal is coupled through transistors 35 and 36 to terminal 22 and to AGC circuit 26 thereby permitting AGC circuit 26 to adjust to the stronger received signal.

Although the invention has been described above in connection with a particular arrangement of circuits in a television receiver, it will be evident to those skilled in the art that the invention can also be used to cancel noise signals from the video signal in other circuit arrangements in a television receiver. In one embodiment of the invention for utilization in a television receiver in the described arrangement, the preferred embodiment was integrated on a monolithic semiconductor chip along with the controlled oscillator disclosed in the above-referenced copending application Ser. No. 207,216. In the noted embodiment the circuit components had the following values:

| | |
|---|---|
| Resistance (in ohms): | |
| **31, 67, 74, 90** | 1K |
| **32** | 4.3K |
| **37** | 240 |
| **44** | 6.2K |
| **51** | 750 |
| **53** | 3.9K |
| **55, 63** | 3.6K |
| **57, 61, 64** | 50K |
| **71,73** | 220 |
| **77, 84** | 4.7K |
| **80** | 1.5K |
| **85** | 470K |
| Capacitances: | |
| **75** | 0.22 microfarads |
| **81** | 0.068 microfarads |
| **82** | 6800 picofarads |
| Coil **76** | 820 microhenries |
| Source **33** | 20 volts |

Those skilled in the art will realize that the invention is not limited to the above component values nor to the specific circuit arrangement.

Accordingly, there has been shown and described a noise suppression circuit for suppressing noise signals in composite video signals in television receivers. A circuit in accordance with the invention has numerous advantages over the prior art. The circuit provides superior performance and reliability and is also suitable for integration on a monolithic semiconductor chip together with other circuits thereby providing an inexpensive and compact component.

While there has been shown and described what is at present considered the preferred embodiment of the invention, it will be obvious to those skilled in the art that various changes and modifications may be made therein without departing from the scope of the invention as defined by the appended claims.

What is claimed is:

1. In a television receiver having a signal processing channel for processing a received television signal to provide a composite video signal including video information and synchronizing information in the form of pulses, a noise suppression circuit having an input connected to receive said composite video signal and an output comprising:

amplifying means for amplifying said composite video signal;

noise detecting means for providing a signal indicative of noise signals having amplitudes greater than the synchronizing pulses;

means connecting said amplifying means and said noise detecting means to said input for coupling said composite video signal thereto;

a transistor having an output electrode connected to said amplifying means, an input electrode connected to said noise detecting means, and a reference electrode, said transistor being operable to switch to a conducting condition in response to the signal from said noise detecting means to suppress noise signals in said composite video signal;

a first current source connected to said reference electrode of said transistor; and a second current source connected to said output electrode of said transistor for providing a current larger than the current provided by said first current source.

2. A noise suppression circuit as defined in claim 1 including a coupling capacitor connected between said reference electrode of said transistor and a source of reference potential for ac coupling said reference electrode to the source of reference potential.

3. A noise suppression circuit as defined in claim 2 wherein said first current source is connected in parallel with said coupling capacitor for rapidly discharging said coupling capacitor.

4. A noise suppression circuit as defined in claim 1 wherein said first and second current sources each include a transistor biased to provide a substantially constant current.

5. A noise suppression circuit as defined in claim 4 wherein said second current source includes a second transistor connected in parallel with the first-named transistor of said second current source for switching to a conducting condition when the voltage of the output electrode of said first-named transistor drops a predetermined amount.

6. In a television receiver having a signal processing channel for processing a received television signal to provide a composite video signal including video information and synchronizing information in the form of pulses and a synchronizing channel connected to said signal processing channel for receiving at least the synchronizing pulses of said composite video signal for synchronizing the operation of a display device with the received television signal, said synchronizing channel including a noise suppression circuit connected between said signal processing channel and a synchronizing pulse separator, said noise suppression circuit comprising:

a first transistor means connected between said signal processing channel and said synchronizing pulse separator for coupling the synchronizing pulses therethrough;

a second transistor means for detecting noise signals in said composite video signal having amplitudes greater than the synchronizing pulses and for providing a signal indicative thereof;

a transistor having an input electrode connected to said second transistor means, an output electrode connected to said first transistor means, and a reference electrode for suppressing noise signals at said output electrode in response to detection of the noise signals by said second transistor means;

a first current source connected to said reference electrode of said transistor; and a second current source connected to said output electrode of said transistor for providing a current larger than the current provided by said first current source.

7. A noise suppression circuit as defined in claim 6 including a coupling capacitor connected between said referrence electrode of said transistor and a source of reference potential for ac coupling said reference electrode to source of reference potential.

8. A noise suppression circuit as defined in claim 7 wherein said first current source is connected in parallel with said coupling capacitor for rapidly discharging said coupling capacitor.

9. A noise suppression circuit as defined in claim 8 wherein said first and second current sources each include a transistor biased to provide a substantially constant current.

10. A noise suppression circuit as defined in claim 8 wherein said second current source includes a second transistor biased to provide a substantially constant current and a third transistor connected in parallel with said second transistor for switching to a conducting condition when the voltage of the output electrode of said first-named transistor drops a predetermined amount.

11. A noise suppression circuit as defined in claim 6 wherein said first transistor means includes a first transistor amplifier connected between said signal processing channel and said output electrode of said transistor and a second transistor amplifier connected between said output electrode of said transistor and said synchronizing pulse separator.

12. A noise suppression circuit as defined in claim 6 wherein said second transistor means includes a second transistor biased to be nonconductive at the amplitude of the synchronizing pulses and conductive at a predetermined greater signal amplitude.

* * * * *